(12) United States Patent
Sasaki

(10) Patent No.: US 8,836,868 B2
(45) Date of Patent: Sep. 16, 2014

(54) TERMINAL DEVICE, TERMINAL CONTROL METHOD, AND PROGRAM

(75) Inventor: Tadashi Sasaki, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 186 days.

(21) Appl. No.: 13/412,178

(22) Filed: Mar. 5, 2012

(65) Prior Publication Data
US 2013/0044265 A1 Feb. 21, 2013

Related U.S. Application Data

(60) Provisional application No. 61/525,471, filed on Aug. 19, 2011.

(51) Int. Cl.
*H04N 5/50* (2006.01)

(52) U.S. Cl.
CPC ........................ *H04N 5/50* (2013.01)
USPC ............ 348/731; 455/572; 455/561; 323/304

(58) Field of Classification Search
CPC ....................................................... H04N 5/50
USPC ................. 348/731; 345/173; 455/345, 452.1
See application file for complete search history.

(56) References Cited

U.S. PATENT DOCUMENTS

| | | | |
|---|---|---|---|
| 2005/0064842 A1* | 3/2005 | Patel | 455/345 |
| 2008/0003950 A1 | 1/2008 | Haapoja et al. | |
| 2009/0015215 A1 | 1/2009 | Ajram et al. | |
| 2009/0253391 A1 | 10/2009 | Zhang | |
| 2011/0014890 A1 | 1/2011 | Ajram et al. | |
| 2011/0025625 A1* | 2/2011 | Hirako | 345/173 |
| 2011/0074211 A1 | 3/2011 | Hampo et al. | |
| 2011/0075721 A1 | 3/2011 | Minakawa et al. | |
| 2012/0184283 A1* | 7/2012 | Mueck | 455/452.1 |

FOREIGN PATENT DOCUMENTS

| | | |
|---|---|---|
| JP | 6-303772 A | 10/1994 |
| JP | 2010-109789 | 5/2010 |
| WO | WO 2008/000916 A1 | 1/2008 |

OTHER PUBLICATIONS

The Extended European Search Report issued May 3, 2013, in Application No. / Patent No. 12153289.9—1852 / 2560304.

Partial European Search Report issued Dec. 5, 2012, in European Patent Application No. 12153289.9.

\* cited by examiner

*Primary Examiner* — Jefferey Harold
*Assistant Examiner* — Sihar Karwan
(74) *Attorney, Agent, or Firm* — Oblon, Spivak, McClelland, Maier & Neustadt, L.L.P.

(57) ABSTRACT

An information processing apparatus including an interface that receives a wireless signal, a power supply that converts an input direct current (DC) power supply into a predetermined voltage by switching the input DC power supply at a switching frequency to generate a driving power supply, and a controller that controls the switching frequency based on a condition of the interface.

11 Claims, 10 Drawing Sheets

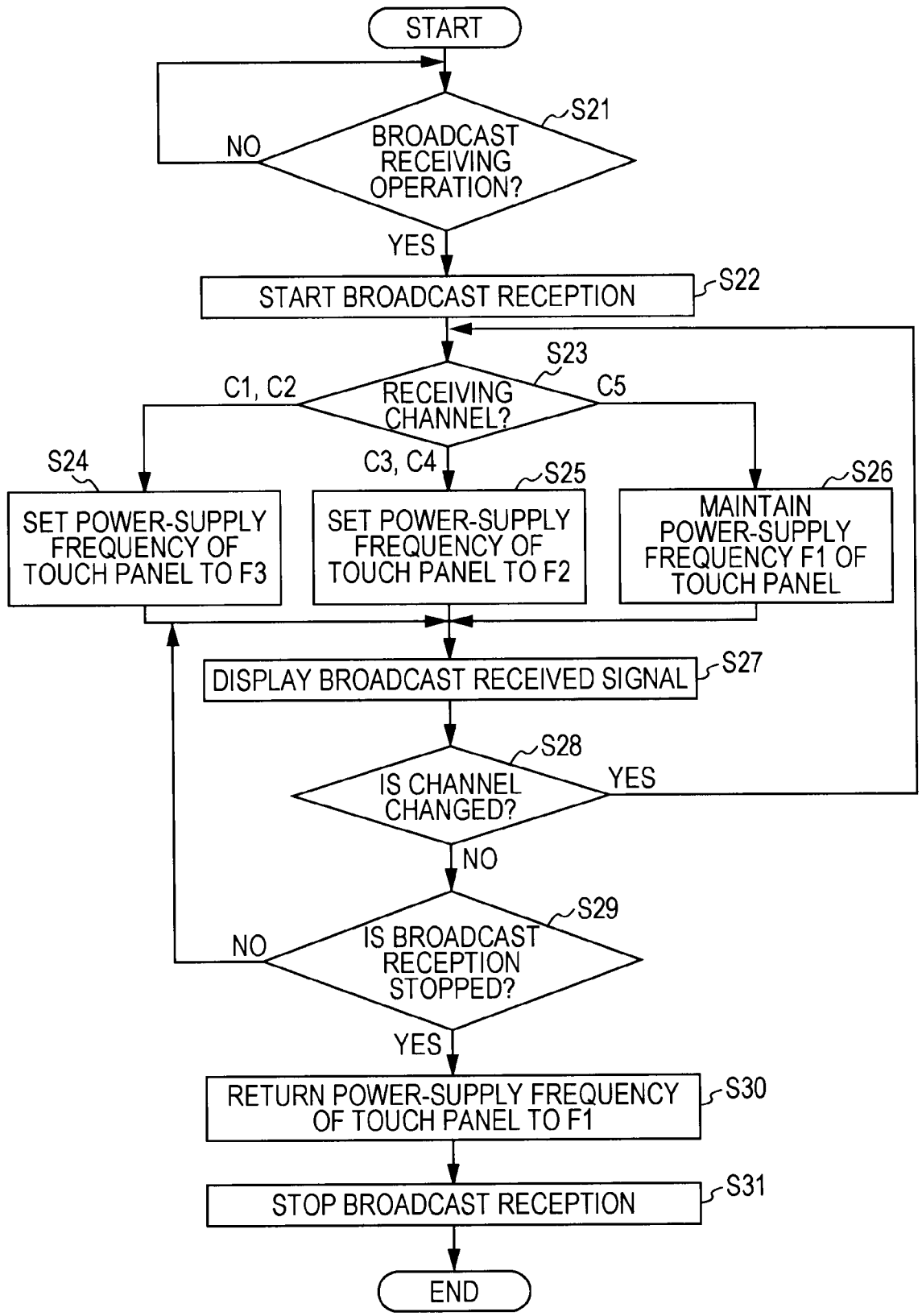

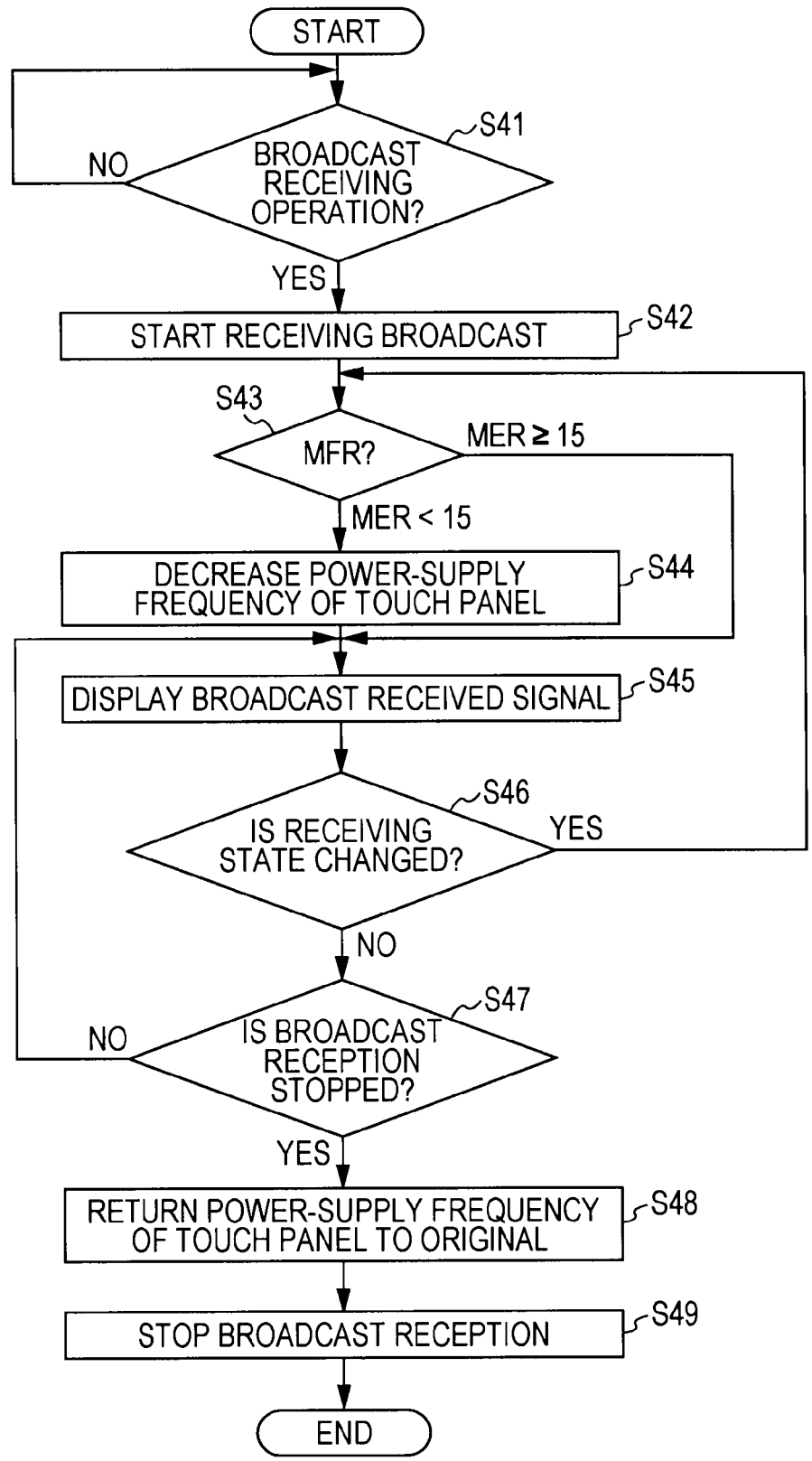

TERMINAL DEVICE, TERMINAL CONTROL METHOD, AND PROGRAM

CROSS REFERENCE TO RELATED APPLICATION

The present application claims the benefit of the earlier filing date of U.S. Provisional Patent Application Ser. No. 61/525,471 filed on Aug. 19, 2011, the entire contents of which is incorporated herein by reference.

BACKGROUND

1. Field of the Disclosure

The present disclosure relates to a terminal device such as a mobile phone terminal device, to a terminal control method of controlling the terminal device, and to a program that executes the terminal control method. In particular, the present disclosure relates to a technology that is applied to a terminal device having a function of receiving a radio signal, such as a television broadcast signal.

2. Description of Related Art

As display panels provided in portable small terminal devices, such as mobile phone terminal devices, display panels having a touch panel have become popular. Touch panels are input devices through which input is possible by touching the display surface thereof with fingers or a pen, and thus, various input operations become possible in coordination with display on a display panel.

Additionally, small terminal devices, such as mobile phone terminal devices, are formed into multi-functional terminal devices by incorporating a function differing from the original function, such as a wireless phone call function. For example, mobile phone terminal devices having a function of receiving a television broadcast signal and performing display and audio output of a video by using the received broadcast signal have been developed.

SUMMARY

In the case where a small terminal device is to receive a television broadcast signal, it is necessary to receive a broadcast signal by using an antenna incorporated in or connected in the terminal device, and it is necessary to efficiently receive the broadcast signal by using a comparatively small antenna. A television broadcast signal transmitted from a terrestrial transmitting station is transmitted at, for example, approximately several tens of MHz to several hundreds of MHz, and an antenna provided in the terminal device receives a radio signal at a frequency of several tens of MHz to several hundreds of MHz.

Here, in the case where a terminal device that receives a television broadcast signal has a touch panel incorporated therein, harmonics of the signal that is used to drive the touch panel are generated up to approximately several hundreds of MHz, and become interference waves in the case where a television broadcast signal is being received. The reason for this is that since the touch panel is driven with a signal of a comparatively high frequency, harmonics of approximately several hundreds of MHz are generated.

Furthermore, the touch panel has a configuration that is integral with a display panel, and it is difficult to prevent interference waves by using a shielding mechanism or the like. Consequently, interference waves are received by an antenna for transmitting/receiving a television broadcast, which is provided in the terminal device. Therefore, in the terminal device including a touch panel, a problem arises in that the reception performance of a television broadcast is deteriorated.

It is also considered that while a television broadcast is being received, the operation of the touch panel is stopped, thereby eliminating generation of interference waves by the touch panel and preventing the deterioration of the reception performance of the television broadcast. However, if touch panel operation is stopped, of course, operation of the touch panel cannot be performed while a television broadcast is being received. For example, it is not possible to perform a channel switching operation while a television broadcast is being viewed by using the touch panel. That is, it becomes not possible to perform a simple operation using a touch panel.

Here, as the influence of a touch panel operation, the influence on reception of a television broadcast has been described. Interference waves generated at the time of a touch panel operation exert an influence on a signal processing unit, other than a broadcast reception processing unit, inside the terminal device.

The present disclosure has been made in view of such points. An object of the present disclosure is to provide a terminal device, a terminal control method, and a program that are capable of reducing the influence of interference waves generated by a touch panel.

According to a first embodiment, the disclosure is directed to an information processing apparatus including an interface that receives a wireless signal, a power supply that converts an input direct current (DC) power supply into a predetermined voltage by switching the input DC power supply at a switching frequency to generate a driving power supply, and a controller that controls the switching frequency based on a condition of the interface.

According to another embodiment, the disclosure is directed to a power supply method performed by an information processing apparatus. The method includes converting, at a power supply of the information processing apparatus, an input direct current (DC) power supply into a predetermined voltage by switching the input DC power supply at a switching frequency to generate a driving power supply, and controlling, by a controller of the information processing apparatus, the switching frequency based on a condition of a interface of the information processing apparatus that receives a wireless signal.

According to another embodiment, the disclosure is directed to a non-transitory computer-readable medium including computer program instructions, which when executed by an information processing apparatus, cause the information processing apparatus to perform a method. The method includes converting an input direct current (DC) power supply into a predetermined voltage by switching the input DC power supply at a switching frequency to generate a driving power supply, and controlling the switching frequency based on a condition of a interface of the information processing apparatus that receives a wireless signal.

According to the present disclosure, when a television broadcast is to be received, it is possible to reduce harmonic components contained in the power supply that drives the touch-panel unit, thereby effectively reducing noise from the touch-panel unit to the tuner, and improving the reception situation of the television broadcast.

BRIEF DESCRIPTION OF DRAWINGS

FIG. 7 is a flowchart illustrating an example of the touch-panel control of a terminal device according to a second embodiment of the present disclosure.

FIG. 9 is a flowchart illustrating an example of the touch-panel control of a terminal device according to a third embodiment of the present disclosure.

DETAILED DESCRIPTION

Figure 1:
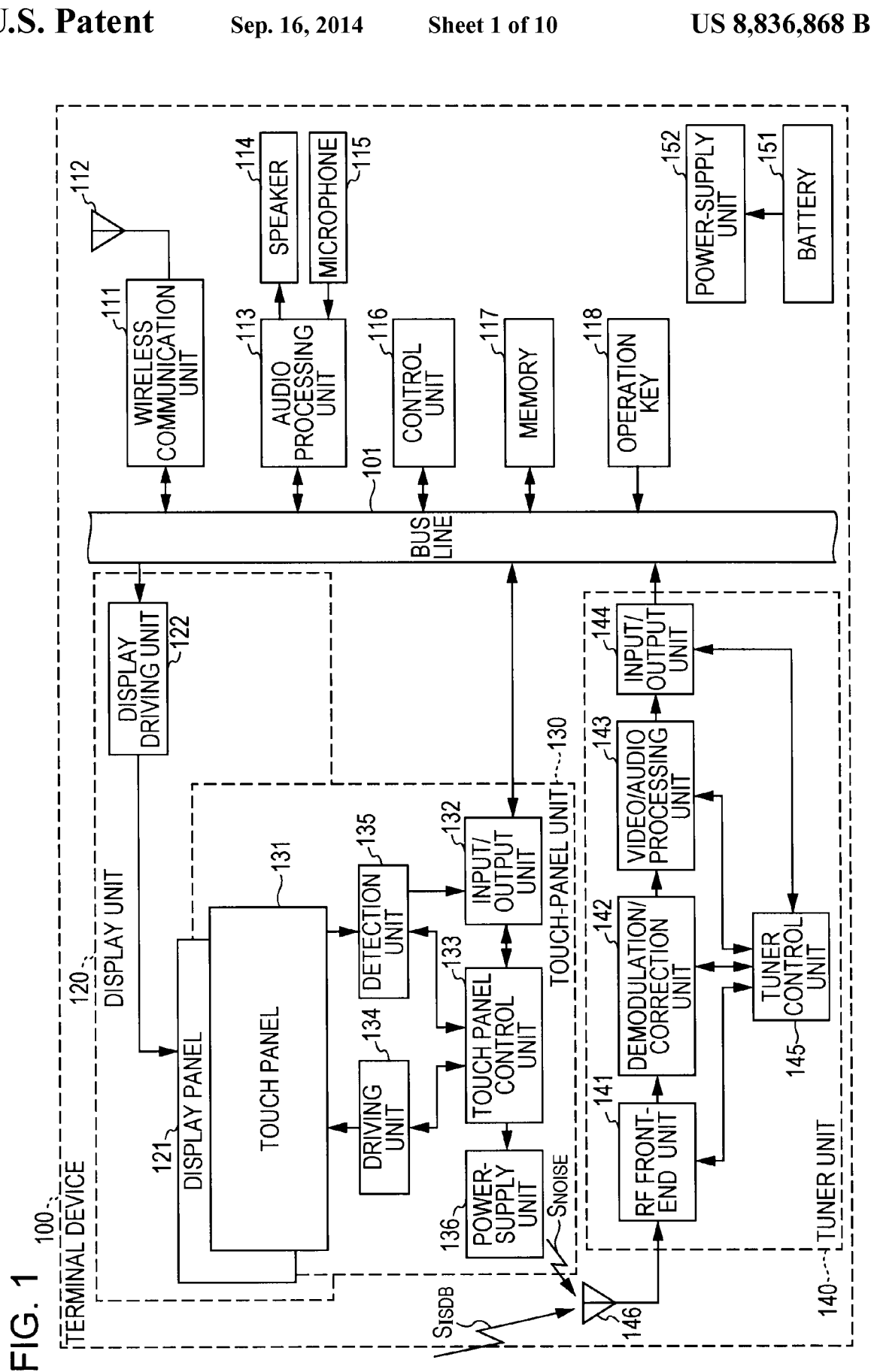
FIG. 1 is a block diagram illustrating an example of the configuration of a terminal device according to a first embodiment of the present disclosure.
Figure 2:
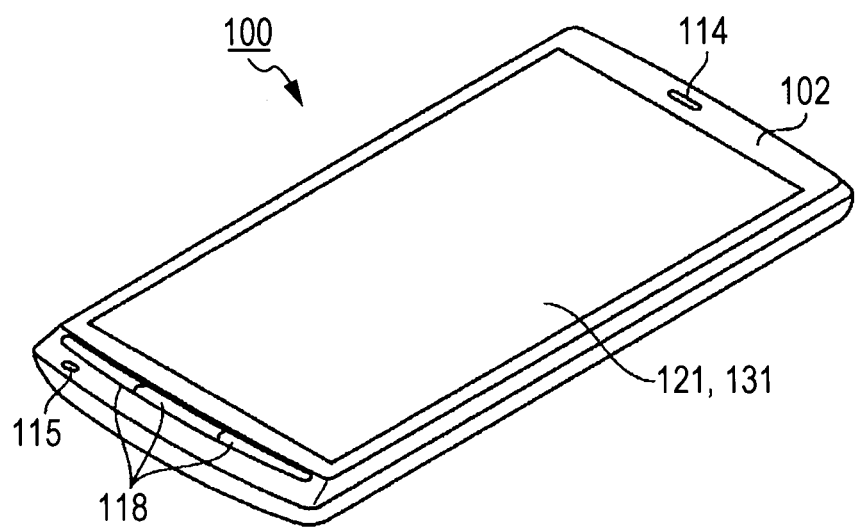
FIG. 2 is a perspective view illustrating an example of the shape of the terminal device of the present disclosure.

Examples of embodiments of the present disclosure will be described in the following order.
1. First Embodiment
1-1. Configuration of Terminal Device (FIG. 1, FIG. 2)
1-2. Configuration of Touch-Panel Power-Supply Unit (FIG. 3, FIG. 4)
1-3. Control Operation at Television Broadcast Receiving Time (FIG. 5, FIG. 6)
2. Second Embodiment
2-1. Control Operation at Television Broadcast Receiving Time (FIG. 7, FIG. 8)
3. Third Embodiment
3-1. Control Operation at Television Broadcast Receiving Time (FIG. 9, FIG. 10)
4. Modification (FIG. 11)
1-1. Configuration of Terminal Device FIG. 1 illustrates the configuration of a terminal device according to a first embodiment of the present disclosure. FIG. 2 illustrates an example of the exterior of the terminal device. A terminal device 100 shown in FIG. 2 is an example in which the terminal device 100 is applied to a multi-functional mobile phone terminal device called a smartphone. As shown in FIG. 2, on the surface of the terminal device 100, a comparatively large (for example, the diagonal line is approximately 4 inches) display panel 121, and a touch panel 131 that detects the touch of the display surface of the display panel 121 are arranged. The display panel 121 and the touch panel 131 may be configured to be integrated with each other.

Furthermore, in the terminal device 100, a speaker 114 for a phone call is arranged in the upper end of the surface thereof, and a microphone 115 for a phone call and a plurality of operation keys 118 are arranged in the low end of the surface thereof. The operation keys 118 may be arranged at a position (not shown), for example, on the side surface.

Next, a description will be given, with reference to FIG. 1, of the configuration of the terminal device 100. The terminal device 100 includes a wireless communication unit 111 for performing wireless communication with a base station for wireless telephone, and an antenna 112 is connected to the wireless communication unit 111. The wireless communication unit 111 performs radio signal transmission and receiving processing under the control of a central control unit (hereinafter referred to as a "control unit") 116 through a bus line 101.

When the wireless communication unit 111 receives audio data for a phone call at the time of a voice phone call, the audio data is supplied to the audio processing unit 113 through the bus line 101, and the audio processing unit 113 performs a demodulation process so as to obtain an analog audio signal. The analog audio signal obtained by the audio processing unit 113 is supplied to the speaker 114, and audio is output from the speaker 114. Furthermore, the audio signal output by the microphone 115 is converted into audio data of the transmission format by the audio processing unit 113, and the converted audio data is supplied to the wireless communication unit 111 through the bus line 101, whereby the data is transmitted in a wireless manner. The speaker 114 and the microphone 115, in addition to being incorporated in the terminal device 100, may be externally provided in the terminal device 100. For example, a speaker and a microphone of a head set, which are connected to the terminals of the terminal device 100, may be used. Furthermore, there is a case in which a speaker and a microphone of a head set, which are wirelessly connected to the terminal device, are used.

In a case where transmission and reception of data for mail, and data communication that goes through a network, such as the Internet, are to be performed by the wireless communication unit 111, the wireless communication unit 111 performs transmission and reception processing under the control of the control unit 116. For example, the data received by the wireless communication unit 111 is stored in a memory 117, and processing, such as display, based on the stored data, is performed under the control of the control unit 116. Furthermore, the data stored by the memory 117 is supplied to the wireless communication unit 111, whereby the data is transmitted in a wireless manner. In the memory 117, a program necessary to control the terminal device 100 is also stored. For example, a program (to be described later) for executing a process for controlling a power-supply unit 136 of a touch-panel unit 130 is also stored in the memory 117.

Furthermore, an operation instruction from the operation keys 118 and an operation instruction from the touch-panel unit 130 reach the control unit 116 through the bus line 101, and the control unit 116, in response to the operation instruction, performs instructions and processing of various operations.

The display unit 120 includes a display panel 121, and a display driving unit 122 for driving the display on the display panel 121. For the display panel 121, for example, a liquid-crystal display panel or an organic EL (Electro Luminescence) display panel is used. The display process on the display unit 120 is performed under the control of the control unit 116. For example, display of a phone call state as the wireless telephone terminal, a telephone directory, and the like, display of electronic mail, display of images obtained from a server that has been accessed through the Internet, and the like are performed under the control of the control unit 116. Furthermore, the terminal device 100 has a function of receiving and displaying a television broadcast as will be described later, and the received video of the television broadcast is also displayed on the display unit 120.

On the surface of the display panel 121 of the display unit 120, a touch panel 131 forming the touch-panel unit 130 is arranged. The touch-panel unit 130 performs a touch detection process for detecting that the surface of the touch panel 131 has been touched with fingers or a pen. For the touch-panel unit 130, for example, touch panels using various methods, such as an electrostatic capacitance method and a resistance film method, can be applied. For example, in the touch-panel unit 130 of the electrostatic capacitance method, many electrodes formed of a transparent conductive film are arranged in the horizontal direction and are also arranged in the vertical direction on the touch panel 131 arranged on the surface of the display panel 121, so that a change in the electrostatic capacitance of the electrode at the position that a finger has touched (approached) is detected.

In order to detect a change in the electrostatic capacitance in the touch panel 131, the touch-panel control unit 133 performs driving of each electrode through a driving unit 134. Then, the touch-panel control unit 133 judges the change of the electrostatic capacitance in the detection unit 135 so as to detect which place on the touch panel 131 has been touched. This detection data is sent from the input/output unit 132 to the bus line 101, and is supplied to the control unit 116.

The terminal device 100 includes a power-supply unit 152 that extracts a DC low-voltage power supply from a battery 151 incorporated in the terminal device 100, and operates each unit inside the terminal device 100 by using the power supply from the power-supply unit 152. Furthermore, the touch-panel unit 130 includes a power-supply unit 136 for a touch panel, and performs a process for stepping up the voltage of the DC power supply supplied from the power-supply unit 152, and generating a power supply for driving the touch panel. By using the power supply of a comparatively high voltage obtained by the power-supply unit 136 for the touch panel, the driving of the electrodes is performed by the driving unit 134.

For the touch-panel power-supply unit 136, a switching regulator that repeats switching at a set switching frequency is used. The switching frequency can be set at plural steps. The setting of the switching frequency is performed by the touch-panel control unit 133 on the basis of the instructions from the control unit 116. The configuration of the power-supply unit 136 using the switching regulator and the control operation of the switching frequency will be described later.

Furthermore, the terminal device 100 includes a tuner unit 140 that receives a television broadcast. The tuner unit 140 includes an RF front-end unit 141 to which an antenna 146 is connected, and receives an indicated channel among television broadcasts of terrestrial digital broadcasts that are transmitted, for example, from a 400 MHz band to a 700 MHz band. The antenna 146 may be any of an antenna incorporated in the terminal device 100 and an external antenna that is connected through a cable.

The signal of the channel, which is received by the RF front-end unit 141 inside the tuner unit 140, is supplied to a demodulation/correction unit 142, whereby demodulation/correction is performed thereon by the demodulation/correction unit 142. The demodulation/correction unit 142 performs, for example, a demodulation process for extracting transmission data that is modulated in each carrier from the signal transmitted as a multi-carrier signal. In addition, the demodulation/correction unit 142 performs a process for correcting the received broadcast data by using correction code attached to the data extracted in the demodulation process.

Then, the broadcast data obtained by performing demodulation/correction by the demodulation/correction unit 142 is supplied to the video/audio processing unit 143. The video/audio processing unit 143 performs a process for extracting video data and extracting audio data, which are contained in the broadcast data. For example, video data and audio data that are coded and transmitted by an MPEG (Moving Picture Experts Group) 2 method, which are contained in the broadcast data, are extracted, and by performing decoding from the MPEG2 coding, video data and audio data are obtained.

Then, the video data obtained by the video/audio processing unit 143 is supplied to the display unit 120 from an input/output unit 144 through the bus line 101, and the video is displayed on the display panel 121. Furthermore, the audio data obtained by the video/audio processing unit 143 is supplied to the audio processing unit 113 from the input/output unit 144 through the bus line 101, and audio is output from the speaker 114.

The setting of the receiving channel in the RF front-end unit 141 of the tuner unit 140 is determined and controlled by the tuner control unit 145. The processing in the demodulation/correction unit 142 and the video/audio processing unit 143 is also performed under the control of the tuner control unit 145. Furthermore, the demodulation/correction unit 142 obtains values regarding reception sensitivity and reception quality of the received broadcast signal and supplies the values to the tuner control unit 145. Examples of values regarding reception sensitivity and reception quality include an MER value (Modulation Error Ratio) and a BER value (Bit Error Rate). The MER value is such that a difference between the amplitude and the phase of the received signal and the specified amplitude and phase is converted into a numerical value. The BER value is such that an error rate of the received signal is converted into a numerical value.

The tuner control unit 145 receives a television broadcast signal in response to the instructions from the control unit 116 of the terminal device 100. Furthermore, the tuner control unit 145 supplies data on reception quality, such as an MER value, which are obtained during reception, to the control unit 116. When the control unit 116 issues an instruction of setting a receiving channel in the tuner control unit 145, the control unit 116 issues, in driving association with the reception, an instruction of changing the switching frequency of the power-supply unit 136 for the touch panel to the touch-panel control unit 133. The details of the switching frequency changing process of the power-supply unit 136, which is drivingly associated with the receiving channel setting of the television broadcast, will be described later.

1-2. Configuration of Touch-Panel Power-Supply Unit

Next, a description will be given, with reference to FIGS. 3 and 4, of the configuration of the power-supply unit 136 for the touch panel.

Figure 3:
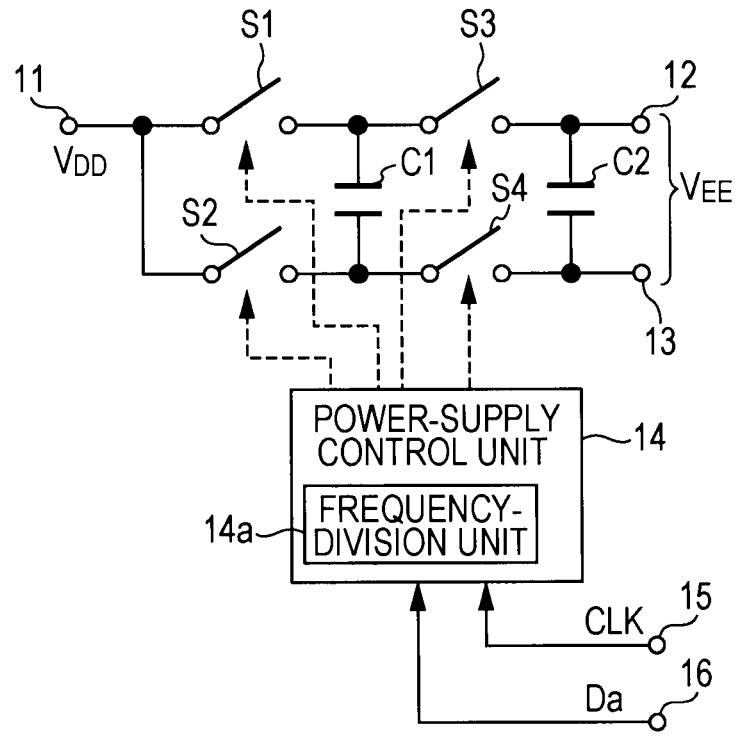
FIG. 3 is a circuit diagram illustrating an example of the configuration of a power supply circuit of the terminal device according to the first embodiment of the present disclosure.

FIG. 3 illustrates the configuration of the power-supply unit 136 for the touch panel. The power-supply unit 136 for the touch panel is a circuit that steps up a power-supply voltage $V_{DD}$ supplied from the power-supply unit 152 and generates a power-supply voltage $V_{EE}$ for driving the touch panel. The power-supply voltage $V_{DD}$ is, for example, a DC voltage of approximately 3 V, and the power-supply voltage $V_{EE}$ for driving the touch panel is, for example, a DC voltage higher than the power-supply voltage $V_{DD}$, such as, for example, 6V.

A description will be given of the configuration of the power-supply unit 136 shown in FIG. 3. An input terminal 11 at which the power-supply voltage $V_{DD}$ is obtained from the power-supply unit 152 is connected to one end of a capacitor C1 through a switch S1, and the other end of the capacitor C1 is connected to an output terminal 13 (the other end of the capacitor C2) through a switch S4 (first state, see FIG. 4A). After that, the input terminal 11 is connected to the other end of the capacitor C1 through a switch S2, and one end of the capacitor C1 is connected to an output terminal 12 (one end of the capacitor C2) through a switch S3 (second state, see FIG. 4B). By performing on/off control of the first state and the second state at high speed, as will be described later, the power-supply voltage $V_{EE}$ for driving the touch panel is obtained at the output terminals 12 and 13.

The on/off control of each of the switches S1 to S4 is performed by the power-supply control unit 14. A clock CLK is supplied to the power-supply control unit 14 from a clock generation circuit (not shown) inside the terminal device 100 through a clock input terminal 15. The clock CLK is set as, for example, a clock of a frequency of 24 MHz. The supplied clock CLK is frequency-divided by a frequency-division unit 14a inside the power-supply control unit 14, and a signal of a switching frequency at which the switches Si to S4 are switched is generated.

In this case, the frequency division ratio at which frequency division is performed by the frequency-division unit 14a is set using control data Da that is supplied through a control data input terminal 16, and the switching frequency is varied at plural steps. The control data Da that is obtained in the control data input terminal 16 is supplied from the control unit 116 through the bus line 101.

Figure 4A:
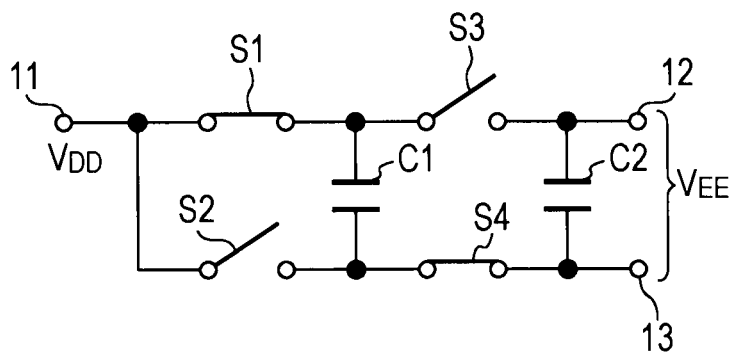
FIG. 4 is an illustration illustrating an example of the operation of the power supply circuit in the example of FIG. 3.
Figure 4B:
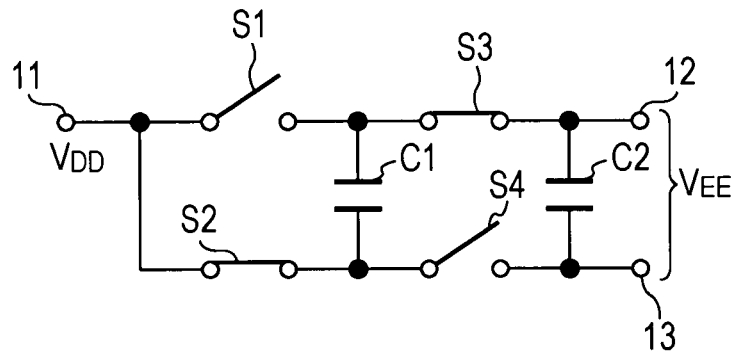

FIGS. 4A-4B illustrate the states of the switches Si to S4 when the power-supply unit 136 operates.

At a certain time, as shown in FIG. 4A, the switch Si and the switch S4 are turned on, and the switch S2 and the switch S3 are turned off. In the state shown in FIG. 4A, electric charge is stored in the capacitor C1 at the power-supply voltage $V_{DD}$ obtained in the input terminal 11.

After that, as shown in FIG. 4B, the switch Si and the switch S4 are turned off, and the switch S2 and the switch S3 are turned on. In the state shown in FIG. 4B, the power-supply voltage $V_{DD}$ obtained in the input terminal 11 is applied to the other end side (in the lower side in the figure) of the capacitor C1, and the electrical potential of one end side (+side) of the capacitor C1 becomes (2 $V_{DD}$).

In the state shown in FIG. 4B, since the switch S3 is in an on state, electric charge is stored in the capacitor C2 at a voltage twice the power-supply voltage $V_{DD}$. Then, as a result of returning from the state of the switch shown in FIG. 4B to the state of the switch shown in FIG. 4A, the voltage of (2 $V_{DD}$) stored in the capacitor C2 is obtained as a power-supply voltage $V_{EE}$ in the output terminals 12 and 13. However, the time period during which the voltage $V_{EE}$ twice the input voltage is output from the capacitor C2 is a short time period corresponding to the capacitances of the capacitors C1 and C2. In order to maintain the output voltage $V_{EE}$ at a stabilized fixed voltage value, it is necessary to alternately switch between the switch state shown in FIG. 4A and the switch state shown in FIG. 4B. In the example of the present embodiment, at the time of the normal state, by setting, to 24 MHz, the switching frequency at which a switch is switched, the state shown in FIG. 4A and the state shown in FIG. 4B are repeated. When the switching frequency is 24 MHz, the power-supply voltage $V_{EE}$ obtained in the output terminals 12 and 13 becomes a stabilized voltage value with small variations, and a satisfactory power supply for driving the touch panel is obtained.

Furthermore, in the example of the present embodiment, by switching the frequency division ratio of the frequency-division unit 14a inside the power-supply control unit 14 shown in FIG. 3, the switching frequency can be set to 12 MHz and 6 MHz in addition to 24 MHz at a normal time. The switching of the switching frequency is performed using the control data Da that is supplied from the control unit 116 through the control data input terminal 16. In the case where the switching frequency is set to 12 MHz or 6 MHz, the stability of the power-supply voltage $V_{EE}$ becomes worse, and a ripple voltage at which the voltage varies is generated at the switching frequency. The lower the switching frequency becomes, the larger the ripple voltage becomes.

The power-supply voltage $V_{EE}$ that is generated in the power-supply unit 136 shown in FIGS. 3 and 4 is a voltage for driving the touch-panel unit 130. From the viewpoint of the stabilized operation of the touch-panel unit 130, it is preferable that, originally, the power-supply voltage $V_{EE}$ is a power supply with a small ripple voltage. Therefore, in a situation (at normal operation time) in which the switching frequency does not need to be limited, the switching frequency is set to 24 MHz.

However, even with the power-supply voltage $V_{EE}$ in which a ripple voltage is generated at a comparatively high voltage with the switching frequency being set to 12 MHz or 6 MHz, it is possible to drive the touch-panel unit 130. For this reason, in the case of a situation in which a high switching frequency like 24 MHz is undesirable for the terminal device 100, the switching frequency is set to 12 MHz or 6 MHz under the control of the control unit 116. A process for switching the switching frequency will be described with reference to the flowchart of FIG. 5 below. In the case where the switching frequency in the power-supply unit 136 is low, response of detecting the touch of the panel surface by the touch-panel unit 130 becomes slightly slow due to the influence of the ripple voltage.

1-3. Control Operation at Television Broadcast Receiving Time

Next, with reference to the flowchart of FIG. 5 and the frequency characteristic view of FIG. 6, a description will be given of processing in a case where a television broadcast is received by the terminal device 100.

The tuner unit 140 inside the terminal device 100 receives a terrestrial digital broadcast $S_{ISDB}$ of the band of several hundreds of MHz. In the case where a terrestrial digital broadcast $S_{ISDB}$ is received, harmonics at a step-up switching frequency in the power-supply unit 136 provided in the touch-panel unit 130 become interference waves $S_{NOISE}$ overlapping the reception frequency, and may cause interference to the reception of the television broadcast. If there are interference waves $S_{NOISE}$ overlapping the reception frequency, the reception of the television broadcast in the tuner unit 140 is obstructed, the receiving state becomes poor, and in the worst case, a state in which a television broadcast cannot be received is assumed. In particular, in the case where a comparatively large display panel 121 and touch panel 131 are arranged in the small terminal device 100 shown in FIG. 2, such a problem appears noticeably. That is, inside the terminal device 100, it is difficult to greatly separate the arrangement positions of the touch panel 131 on which detection electrodes are arranged and an antenna 146 for broadcast reception, and there is a high probability that harmonics of the power supply that drives the touch panel cause interference to the broadcast signal received by the antenna.

In the present embodiment, in order to prevent such generation of harmonics that cause interference to the reception in the tuner unit 140, the control unit 116 performs control of the switching frequency corresponding to the operating state of the tuner unit 140.

Figure 5:
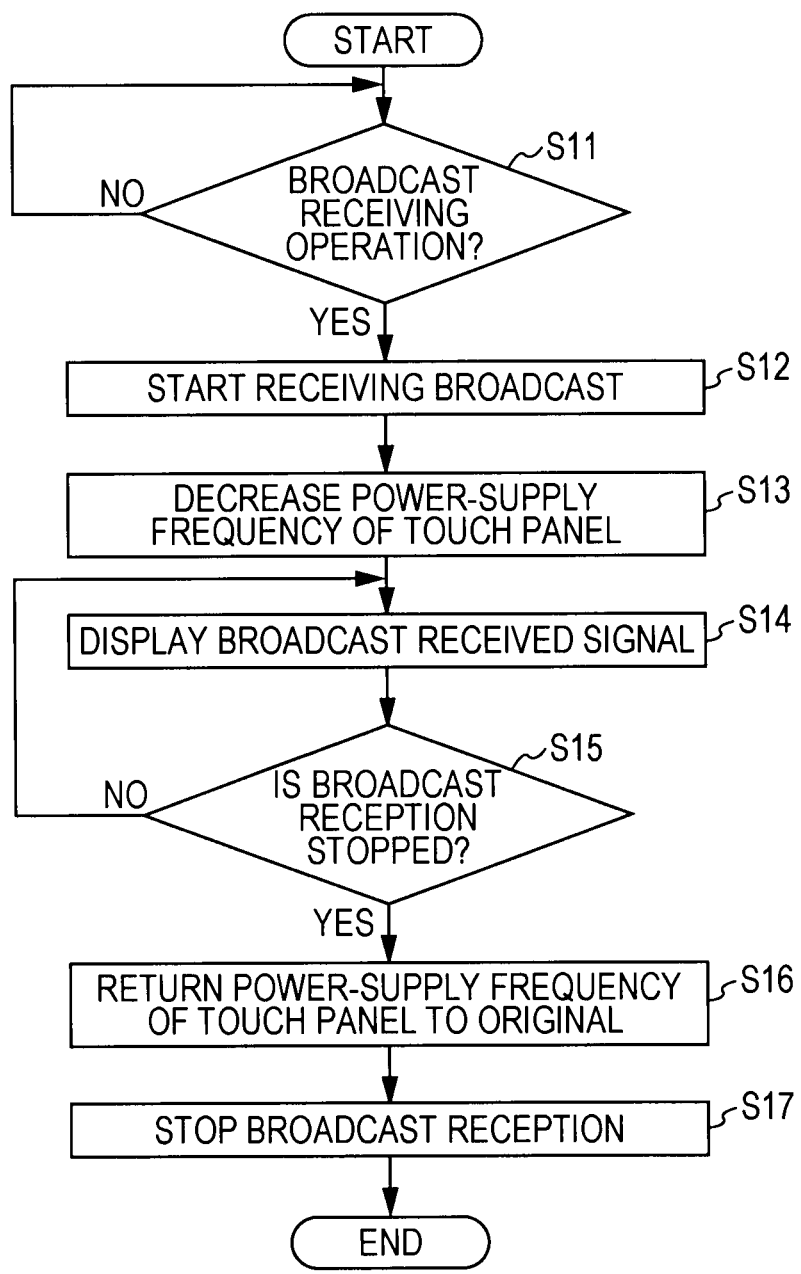
FIG. 5 is a flowchart illustrating an example of touch-panel control of the terminal device according to the first embodiment of the present disclosure.

The flowchart of FIG. 5 illustrates an example of a control process of the control unit 116 for the purpose of preventing generation of harmonics.

Initially, the control unit 116 determines whether or not there is a user operation for receiving a television broadcast (step S11). The user operation is, for example, an operation based on touch detection in the touch-panel unit 130, or an operation using the operation keys 118. In this determination, when it is determined that there is no user operation for receiving a television broadcast, the control unit 116 waits until there is a user operation for receiving a television broadcast.

Then, when it is determined in step S11 that there is a user operation for receiving a television broadcast, the control unit 116 instructs the tuner control unit 145 to receive a television broadcast of a channel indicated by the user operation, and the tuner unit 140 starts reception (step S12). Then, following the reception start in the tuner unit 140, an instruction of lowering the switching frequency of the power-supply unit 136 is sent from the control unit 116 to the touch-panel control unit 133 so as to lower the switching frequency of the power-supply unit 136 for the touch-panel unit 130 (step S13). The lowering of the switching frequency is performed by changing the frequency division ratio of the frequency-division unit 14a shown in FIG. 3, for example, the switching frequency is changed from 24 MHz at a normal time to 12 MHz.

Then, video data that is received and obtained by the tuner unit 140 is supplied to the display unit 120, whereby the video data is displayed (step S14). After the display of the broadcast video has started, the control unit 116 determines whether or not a user operation for stopping the reception of the television broadcast has been performed (step S15). As long as no operation for stopping the reception of the television broadcast has been performed, the state in which the switching frequency has been lowered is maintained.

When it is determined in step S15 that there is a user operation for stopping the reception of the television broadcast, an instruction of returning the switching frequency of the power-supply unit 136 to the original frequency is sent from the control unit 116 to the touch-panel control unit 133 (step S16). As a result of this instruction, the switching frequency of the power-supply unit 136 for the touch-panel unit 130 becomes the original frequency.

Then, in response to the instruction from the control unit 116, the reception of the television broadcast signal in the tuner unit 140 is stopped, and the display of the received video on the display unit 120 is stopped (step S17).

A description will be given, with reference to FIG. 6, of the effect obtained by performing the control process of the flowchart of FIG. 5.

Figure 6A:
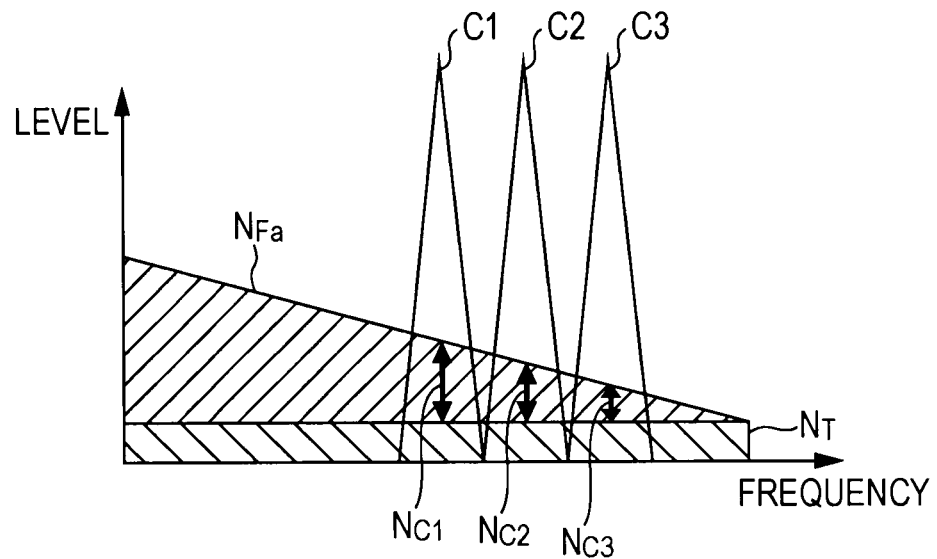
FIG. 6 is a frequency characteristic view illustrating an example of a receiving state according to the first embodiment of the present disclosure.
Figure 6B:
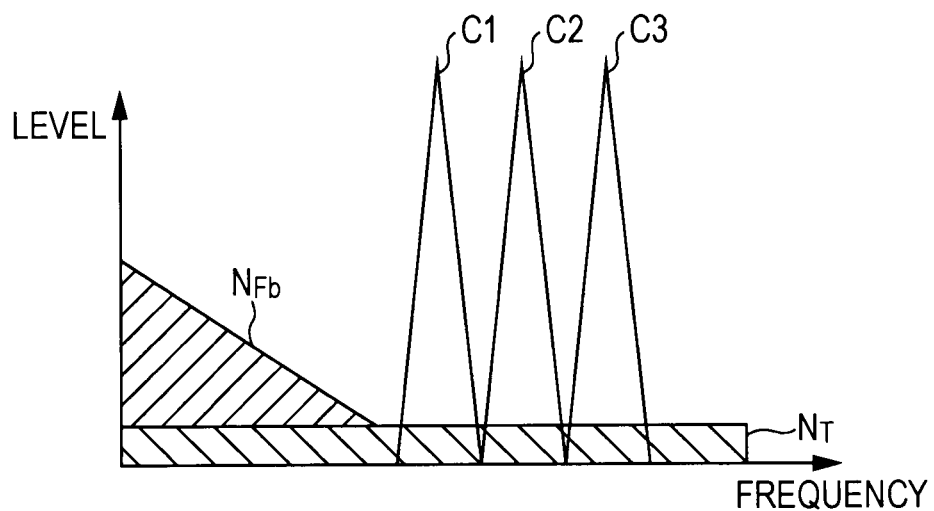

FIGS. 6A and 6B illustrate an overview of a situation in which interference waves that are emitted by the power-supply unit 136 in a switching operation in the band of the television broadcast signal received by the tuner unit 140 are generated. Channels C1, C2, and C3 shown in FIGS. 6A and 6B are portions of channels of a terrestrial digital broadcast $S_{ISDB}$ received by the tuner unit 140. The channels C1, C2, and C3 are channels of a comparatively low frequency band of, for example, approximately 400 MHz. Noise $N_T$ shown in FIGS. 6A and 6B is thermal noise. This thermal noise $N_T$ is contained at a fixed level at any frequency.

FIG. 6A illustrates an example in which the switching frequency of the power-supply unit 136 for the touch-panel unit 130 is 24 MHz at a normal time. FIG. 6B illustrates an example in which the switching frequency of the power-supply unit 136 for the touch-panel unit 130 is set at 12 MHz.

In the case of 24 MHz at a normal time shown in FIG. 6A, noise $N_{Fa}$ due to harmonics of the switching frequency of 24 MHz has reached the transmission frequencies of the channels C1, C2, and C3. That is, the received signal of the channel C1 contains noise $N_{C1}$, the received signal of the channel C2 contains noise $N_{C2}$, and the received signal of the channel C3 contains noise $N_{C3}$. Noise $N_{Fa}$ due to harmonics of the switching frequency decreases with an increase in the frequency of the receiving channel, as shown in FIG. 6A.

In comparison, in a case where the switching frequency of the power-supply unit 136 is set to 12 MHz, as shown in FIG. 6B, noise $N_{C2}$ due to harmonics of the switching frequency of 12 MHz does not reach the transmission frequencies of the channels C1, C2, and C3. Therefore, when the transmission frequencies of the channels C1, C2, and C3 are received, noise from the power-supply unit 136 is not contained.

At the time of the television broadcast reception shown in the flowchart of FIG. 5, reception is performed in the state shown in FIG. 6B. Since a broadcast signal is received by the tuner unit 140 in a state in which there is no influence of power-supply noise, reception becomes possible in a satisfactory situation in which there is no influence of noise.

In the case where the switching frequency of the power-supply unit 136 of the touch-panel unit 130 is set to 12 MHz, which is a lower frequency, a comparatively large ripple voltage is contained in the power-supply voltage. For this reason, the detection situation of the touch-panel unit 130 that is driven by the power supply becomes worse than that at a normal time, and the response of detecting the touch of the panel surface becomes slower than in the case in which the touch-panel unit 130 is driven at the normal switching frequency.

However, in the situation in which the received video of the television broadcast is being displayed on the display unit 120, only limited operations are performed regarding a touch panel operation, and there is no need for high-speed touch detection. Specifically, the operations are a touch operation for channel switching, a touch operation for stopping broadcast reception, a touch operation for sound volume up/down, and the like. Most of them are operations that do not demand a high-speed operation, and inconvenience due to the response of the touch detection becoming slow does not occur.

Therefore, according to the terminal device 100 in accordance with an example of the present embodiment, while a television broadcast is being received by the terminal device 100, generation of an interference wave from the power-supply unit 136 for the touch panel is reduced, and satisfactory reception of a television broadcast with no influence from an interference wave can be performed. Moreover, the operation of lowering the switching frequency is performed while a television broadcast is being received. Consequently, the response of the touch detection of the touch panel is fast other than while a television broadcast is being received and displayed, and the ease of use of the terminal device does not become worse.

2. Second Embodiment

Next, a description will be given, with reference to FIGS. 7 and 8, of an example of a second embodiment of the present disclosure.

In the example of the present embodiment, for the configuration of the terminal device, the configuration of the terminal device 100, which is described with reference to FIGS. 1 and 2 in the example of the first embodiment, is applied.

Then, in the example of the present embodiment, the control operation performed by the control unit 116 when a television broadcast is received by the tuner unit 140 of the terminal device 100 and displayed on the display unit 120 differs from the example of the first embodiment.

Furthermore, the power-supply unit 136 provided in the touch-panel unit 130 of the terminal device 100 of the example of the present embodiment can set the switching frequency at three steps under the control of the touch-panel control unit 133. That is, a switching frequency F1 at a normal time, a switching frequency F2 that is decreased one step from the normal state, and a switching frequency F3 that is decreased further one step can be set under the control of the touch-panel control unit 133. Specifically, the switching frequencies F1, F2, and F3 are set at 24 MHz, 12 MHz, and 6 MHz in this example, respectively.

2-1. Control Operation at Television Broadcast Receiving Time

A description will be given, with reference to the flowchart of FIG. 7, of control operation performed by the control unit 116 when a television broadcast is received in the example of the present embodiment.

As shown in the flowchart of FIG. 7, initially, the control unit 116 determines whether or not there is a user operation for receiving a television broadcast (step S21). In this determination, when it is determined that there is no user operation for receiving a television broadcast, the control unit 116 waits until when there is a user operation for receiving a television broadcast.

Then, when it is determined in step S21 that there is a user operation for receiving a television broadcast, the control unit 116 instructs the tuner control unit 145 to receive a television broadcast of the channel indicated by the user operation, and reception by the tuner unit 140 is started (step S22). Then, the control unit 116 judges which one of the channels C1 and C2 of a first group, the channels C3 and C4 of a second group, and the channel C5 (or frequency higher than that of channel C5) of a third group the receiving channel is (step S23). The transmission frequencies of the channels of the groups are such that the channel of the first group is a channel of the lowest frequency, and the frequency relationship: the first group <the second group <the third group holds.

When it is determined in step S23 that the receiving channel is to receive the channel C1 or C2 of the first group, an instruction of setting the switching frequency of the power-supply unit 136 to F3 is sent from the control unit 116 to the touch-panel control unit 133. The touch-panel control unit 133 receiving this instruction sets the switching frequency of the power-supply unit 136 for the touch-panel unit 130 to a frequency F3 (6 MHz) (step S24).

Furthermore, when it is determined in step S23 that the receiving channel is to receive the channel C3 or C4 of the second group, an instruction of setting the switching frequency of the power-supply unit 136 to F2 is sent from the control unit 116 to the touch-panel control unit 133. The touch-panel control unit 133 receiving this instruction sets the switching frequency of the power-supply unit 136 for the touch-panel unit 130 to a frequency F2 (12 MHz) (step S25).

In addition, when it is determined in step S23 that the receiving channel is to receive the channel C5 of the third group, the control unit 116 sets the switching frequency of the power-supply unit 136 to F1 (24 MHz) (step S26). The switching frequency F1 (24 MHz) is a switching frequency at a normal time.

Then, in a state in which the switching frequency is set at each of steps S24, S25, and S26 in correspondence with the receiving channel, the video data that is received and obtained by the tuner unit 140 is supplied to the display unit 120 and displayed thereon (step S27). After the display of the broadcast video is started, it is determined whether or not there is an operation of changing the receiving channel of the television broadcast (step S28). When it is determined that there is a changing operation, the process returns to the determination of step S23. Then, in the processing of steps S23 to S26, the switching frequency is set as a switching frequency corresponding to the channel group after being changed.

When it is determined in step S28 that there is no changing operation of the receiving channel of the television broadcast, next, it is determined whether or not there is a user operation of stopping the reception of the television broadcast (step S29). In a case where there is no stopping operation, the display of the received video in step S27 is continued.

When it is determined in step S29 that there is a user operation for stopping the reception of the television broadcast, an instruction of returning the switching frequency of the power-supply unit 136 to the frequency F1 at a normal time is sent from the control unit 116 to the touch-panel control unit 133 (step S30). In response to this instruction, the switching frequency of the power-supply unit 136 for the touch-panel unit 130 becomes the original frequency F1. In a situation in which the frequency F1 corresponding to the channel C5 is set in step S26, the switching frequency that is set in step S30 is the same, and thus, an instruction, such as a change of the frequency, is not necessary.

Then, in response to the instruction from the control unit 116, the reception of the television broadcast signal by the tuner unit 140 is stopped, and the display of the received video on the display unit 120 is stopped (step S31).

A description will be given, with reference to FIG. 8, of the effect obtained by performing the control process of the flowchart of FIG. 7.

Figure 8A:
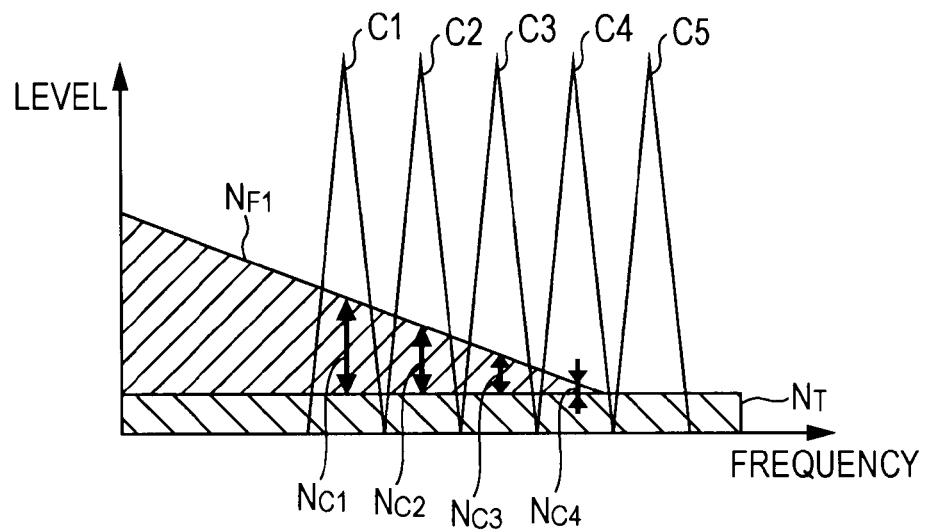
FIG. 8 is a frequency characteristic view illustrating an example of a receiving state according to the second embodiment of the present disclosure.
Figure 8B:
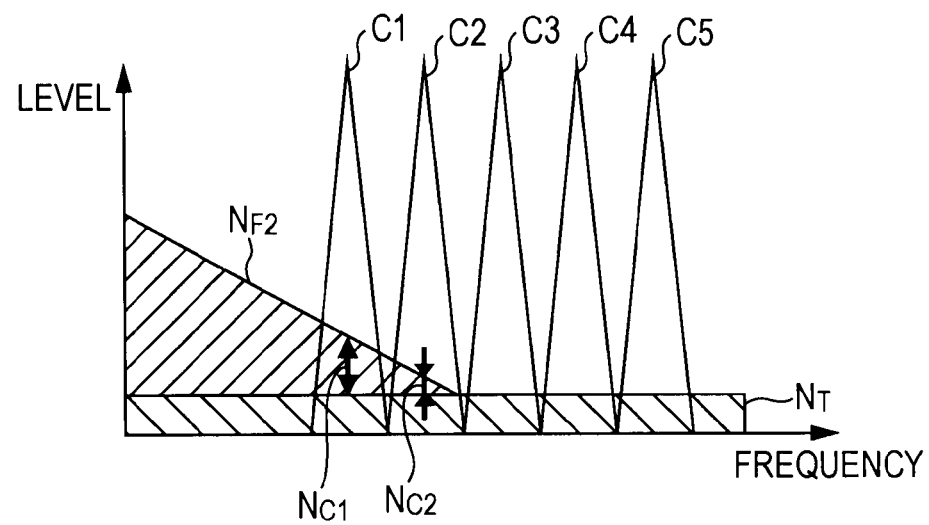
Figure 8C:
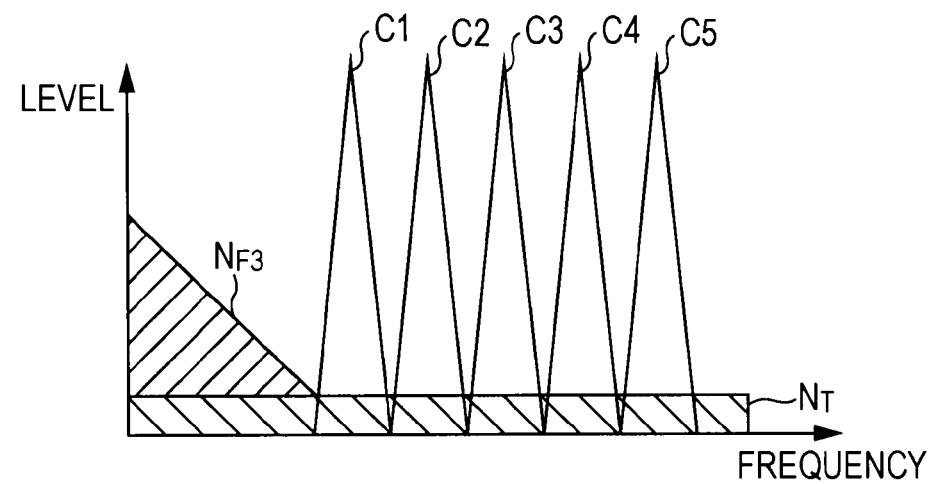

FIGS. 8A-8C illustrate an overview of a situation in which an interference wave emitted by the power-supply unit 136 in a switching operation in the band of the television broadcast signal that is received by the tuner unit 140 is generated. Channels C1, C2, C3, C4, and C5 shown in FIGS. 8A-8C are portions of the channel of the terrestrial digital broadcast $S_{ISDB}$ that is received by the tuner unit 140. A broadcast channel does not exist at a frequency lower than that of the channel C1. Noise $N_T$ shown in FIGS. 8A, 8B and 8C is thermal noise. This thermal noise $N_T$ is contained at a fixed level at any frequency. FIG. 8A illustrates an example when the switching frequency of the power-supply unit 136 for the touch-panel unit 130 is a frequency F1 (24 MHz). FIG. 8B illustrates an example of the switching frequency F2 (12 MHz) of the power-supply unit 136 for the touch-panel unit 130. FIG. 8C illustrates an example of the switching frequency F3 (6 MHz) of the power-supply unit 136 for the touch-panel unit 130.

In the case of 24 MHz at a normal time shown in FIG. 8A, noise $N_{F1}$ due to harmonics at the switching frequency of 24 MHz has reached the transmission frequencies of the channels (channel C1 to channel C4) of the first group and the second group. That is, the received signal of the channel C1 contains noise $N_{C1}$, the received signal of the channel C2 contains noise $N_{C2}$, the received signal of the channel C3 contains noise $N_{C3}$, and the received signal of the channel C4 contains noise $N_{C4}$. Noise $N_{C1}$ to noise $N_{C4}$ at each channel due to harmonics of the switching frequency are at a lower level with an increase in the frequency of the channel.

In the state of FIG. 8A, in the channel C5 (and channel at a frequency higher than that) of the third group, noise $N_{F1}$ due to harmonics of the switching frequency does not become an interference wave. For this reason, as shown in the flowchart of FIG. 8, when the channel C5 of the third group and a channel at a frequency higher than that are to be received, the channel C5 can be satisfactorily received while the switching frequency of the power-supply unit 136 is maintained at the frequency F1 (24 MHz) F1 at a normal time.

In a case where the switching frequency of the power-supply unit 136 is set at 12 MHz, as shown in FIG. 8B, noise $N_{F2}$ due to harmonics at the switching frequency of 12 MHz has reached only the transmission frequencies of the channels C1 and C2 of the first group. The noise $N_{F2}$ due to harmonics of the switching frequency of 12 MHz has not reached the channel C3 and a channel at a frequency higher than that. Therefore, as shown in the flowchart of FIG. 7, when the channels C3 and C4 of the second group are to be received, by setting the switching frequency of the power-supply unit 136 to the frequency F2 (12 MHz) lower one step than that at a normal time, it is possible to satisfactorily receive these channels.

In a case where the switching frequency of the power-supply unit 136 is set to 6 MHz, as shown in FIG. 8C, noise $N_{F3}$ due to harmonics of the switching frequency of 6 MHz is at a frequency lower than that of the channel C1.

Therefore, as shown in the flowchart of FIG. 7, when the channels C1 and C2 of the first group are to be received, by setting the switching frequency of the power-supply unit 136 to the frequency F3 (6 MHz) that is two steps lower than that at a normal time, it is possible to satisfactorily receive these channels.

As described above, in the case of the example of the present embodiment, the switching frequency of the power-supply unit 136 for the touch panel is set at plural steps in correspondence with the receiving channel so that an interference wave is not generated, and thus, television broadcasts of individual channels can be satisfactorily received.

Moreover, since the switching frequency is set in correspondence with each channel, it is possible to minimize an influence of decrease of the touch detection operation of the touch panel due to a decrease in the switching frequency. As in the channel C5 shown in FIG. 8A, regarding a channel at a comparatively high frequency, the switching frequency is maintained at that at a normal time. When the channel is to be received, the touch detection operation of the touch panel can be performed at a speed and accuracy similar to those at a normal time.

3. Third Embodiment

Next, an example of a third embodiment of the present disclosure will be described with reference to FIGS. 9 and 10A-10C.

In the example of the present embodiment, for the configuration of the terminal device, the configuration of the terminal device 100 described with reference to FIGS. 1 and 2 in the example of the first embodiment is applied.

Then, in the example of the present embodiment, the control operation performed by the control unit 116 when the tuner unit 140 of the terminal device 100 receives a television broadcast and the display unit 120 displays the television broadcast differs from the examples of the first and second embodiments.

Furthermore, in the example of the present embodiment, the tuner unit 140 obtains a value for the reception sensitivity of the television broadcast signal, and the control unit 116 judges the value regarding this reception sensitivity. For the value regarding reception quality, in this example, an MER value (Modulation Error Ratio) corresponding to a CN ratio is used. The better the reception sensitivity becomes, the higher value the MER value becomes. In place of the MER value, a BER value (Bit Error Rate) may be used. Alternatively, both the MER value and the BER value may be used.

3-1. Control Operation At Television Broadcast Receiving Time

With reference to the flowchart of FIG. 9, a description will be given of control operation performed by the control unit 116 when a television broadcast is to be received in the example of the present embodiment.

As shown in the flowchart of FIG. 9, first, the control unit 116 determines whether or not there is a user operation for receiving a television broadcast (step S41). In this determination, when it is determined that there is no user operation for receiving a television broadcast, the control unit 116 waits until there is a user operation for receiving a television broadcast.

Then, when it is determined in step S41 that there is a user operation for receiving a television broadcast, the control unit 116 instructs the tuner control unit 145 to receive the television broadcast of the channel indicated by the user operation, and causes reception in the tuner unit 140 to start (step S42). Then, at this time, the control unit 116 judges the MER value obtained by the tuner unit 140 so as to determine whether or not the MER value is a value which is less than a threshold value serving as a reference or a value which is greater than or equal to the threshold value (step S43). The control unit 116 determines whether or not, for example, the MER value is less than 15. Here, in a case where the MER value is less than 15, the reception sensitivity is in a comparatively low state. An instruction of lowering the switching frequency of the power-supply unit 136 is sent from the control unit 116 to the touch-panel control unit 133. The touch-panel control unit 133 receiving this instruction sets the switching frequency of the power-supply unit 136 for the touch-panel unit 130 to a frequency (12 MHz) that is lowered one step from the frequency (24 MHz) at a normal time (step S44).

In a case where the MER value is 15 or is greater than or equal to 15 in step S43, the switching frequency of the power-supply unit 136 is maintained at the frequency at a normal time (that is, 24 MHz).

Then, the touch-panel control unit 133 supplies the video data received and obtained by the tuner unit 140 to the display unit 120, whereby the video data is displayed (step S45). After the display of the broadcast video is started, it is determined whether or not there is a change in the receiving state at a certain or higher level in the tuner unit 140 (step S46). The change at a certain or higher level at this point refers to, for example, a case in which the reception level of a broadcast signal has greatly changed or a case in which the receiving channel has changed to another channel. In a case where there is such a change, the process returns to the determination of step S43.

If it is determined in step S46 that there is no change in the receiving state at a certain or higher level, next, it is determined whether or not there is a user operation for stopping the reception of the television broadcast (step S47). In the case where there is no operation for stopping the reception of the television broadcast, the display of the received video in step S45 is continued.

When it is determined in step S47 that there is a user operation for stopping the reception of the television broadcast, an instruction of returning the switching frequency of the power-supply unit 136 to the frequency at a normal time is sent from the control unit 116 to the touch-panel control unit 133 (step S48). In response to this instruction, the switching frequency of the power-supply unit 136 for the touch-panel unit 130 becomes the original frequency. When it is determined in step S43 that the MER value is an MER value of greater than or equal to the threshold value, an instruction, such as a change of the frequency, is not necessary in step S48.

Then, in response to the instruction from the control unit 116, the reception of the television broadcast signal in the tuner unit 140 is stopped, and the display of the received video on the display unit 120 is stopped (step S49).

The effect obtained by performing the control process of the flowchart of FIG. 9 will be described with reference to FIG. 10. FIGS. 10A-10C illustrate an overview of a situation in which an interference wave that is emitted by a switching operation in a specific channel C0 while the tuner unit 140 is performing reception is generated. Noise $N_T$ shown in FIGS. 10A, 10B, and 10C is thermal noise. The thermal noise $N_T$ is contained at a fixed level at any frequency.

Figure 10A:
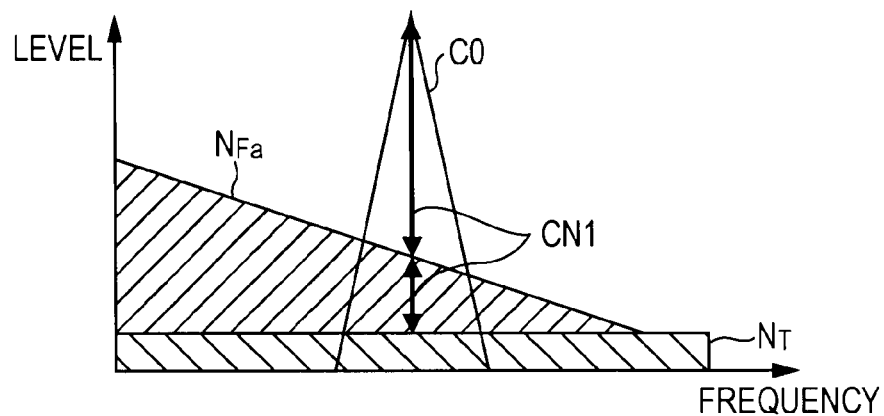
FIG. 10 is a frequency characteristic view illustrating an example of a receiving state according to the third embodiment of the present disclosure.

FIG. 10A illustrates an example in a case in which noise $N_{Fa}$ of a switching frequency due to harmonics is contained at the frequency of the channel C0 that is performing reception. In the case of FIG. 10A, it is assumed that the reception level of the channel CO that is performing reception is sufficiently high, and reception quality CN1 is set at a CN ratio corresponding to a state in which the MER value is greater than or equal to 15. At this time, even if noise $N_{Fa}$ due to harmonics of the switching frequency is not reduced, satisfactory reception in the tuner unit 140 is possible, and the switching frequency is not changed.

Figure 10B:
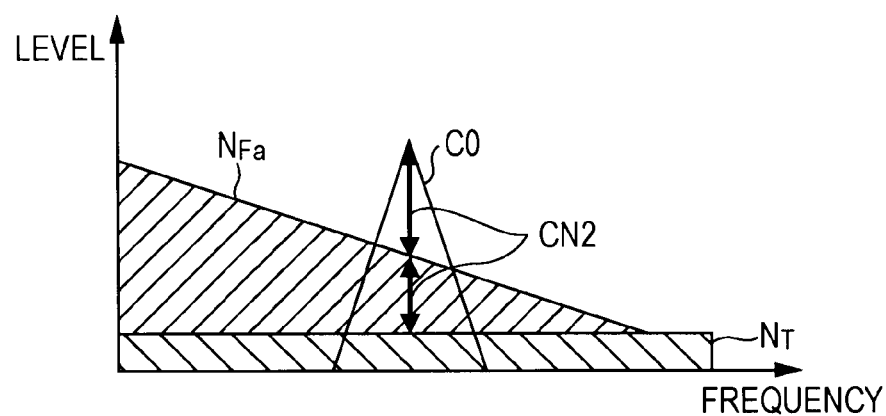

FIG. 10B illustrates an example of a CN ratio in a case where the reception level of the channel CO that is performing reception is lower than that in the case of FIG. 10A, the reception sensitivity of the receiving channel C0 is lower than that, and reception quality CN2 is set at an MER value of less than 15. In this case, a process for reducing noise $N_{Fa}$ due to harmonics by changing the switching frequency is performed.

Figure 10C:
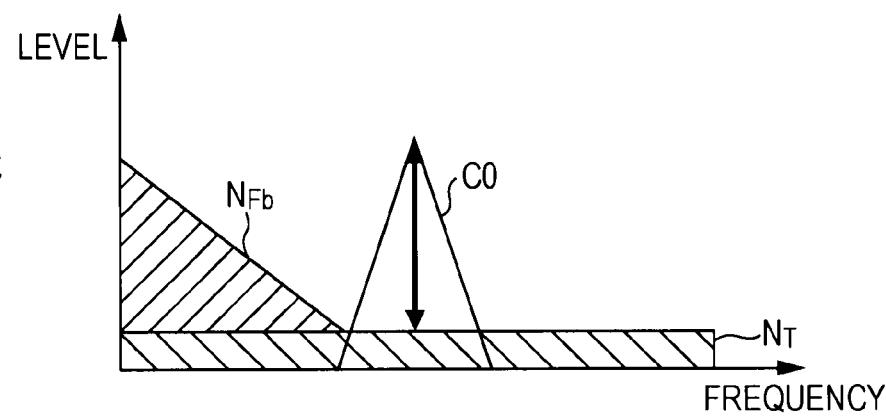

FIG. 10C illustrates a case in which, in the detection of the state shown in FIG. 10B, the switching frequency is changed to a lower frequency, and noise $N_{Fb}$ due to harmonics is reduced. As shown in FIG. 10C, the noise $N_{Fa}$ is reduced as a result of the change of the switching frequency, no influence is received in the reception of the channel C0, and the MER value is increased. Therefore, it becomes possible for the tuner unit 140 to perform satisfactory reception. In step S43 of the flowchart of FIG. 9, by using only the determination as to whether or not the MER value is less than a fixed threshold value in step S43, the switching frequency of the power-supply unit 136 of the touch-panel unit 130 is controlled. The switching frequency may be controlled on the basis of finer determination.

For example, when the MER value that is received and obtained by the tuner unit 140 becomes 12, which is slightly higher than 7, which is the value of a sensitivity point, the switching frequency of the power-supply unit 136 is decreased to a frequency lower than that at a normal time. Then, when the MER value becomes greater than or equal to 5, a process for returning the switching frequency of the power-supply unit 136 to that at a normal time is performed.

In the manner described above, by controlling the switching frequency of the power-supply unit 136, the influence of the power-supply noise in the tuner unit 140 is limited to the receiving state in the vicinity of the sensitivity point, and reception can be stably performed without being affected by power-supply noise.

Furthermore, in the example of FIGS. 9 and 10A-10C, an example has been described in which the switching frequency of the power-supply unit is switched at two steps. Alternatively, the switching frequency may be switched at three steps or more finely than that. For example, as described in the example of the second embodiment, the switching frequency is set at three steps. In a case where the MER value is low, control may be performed such that the switching frequency is gradually lowered until a fixed or higher MER value at which satisfactory reception is possible is obtained.

4. Modification

In the examples of the embodiments up to this point, a description has been given of processing in which an interference wave from a touch panel is reduced in a case where the terminal device 100 receives a television broadcast signal. The interference wave from the touch panel can exert an adverse influence on the signal processing unit inside the terminal device 100. Therefore, the switching frequency of the touch-panel power supply may be switched in accordance with the operating situation of the signal processing unit inside the terminal device 100.

Figure 11:
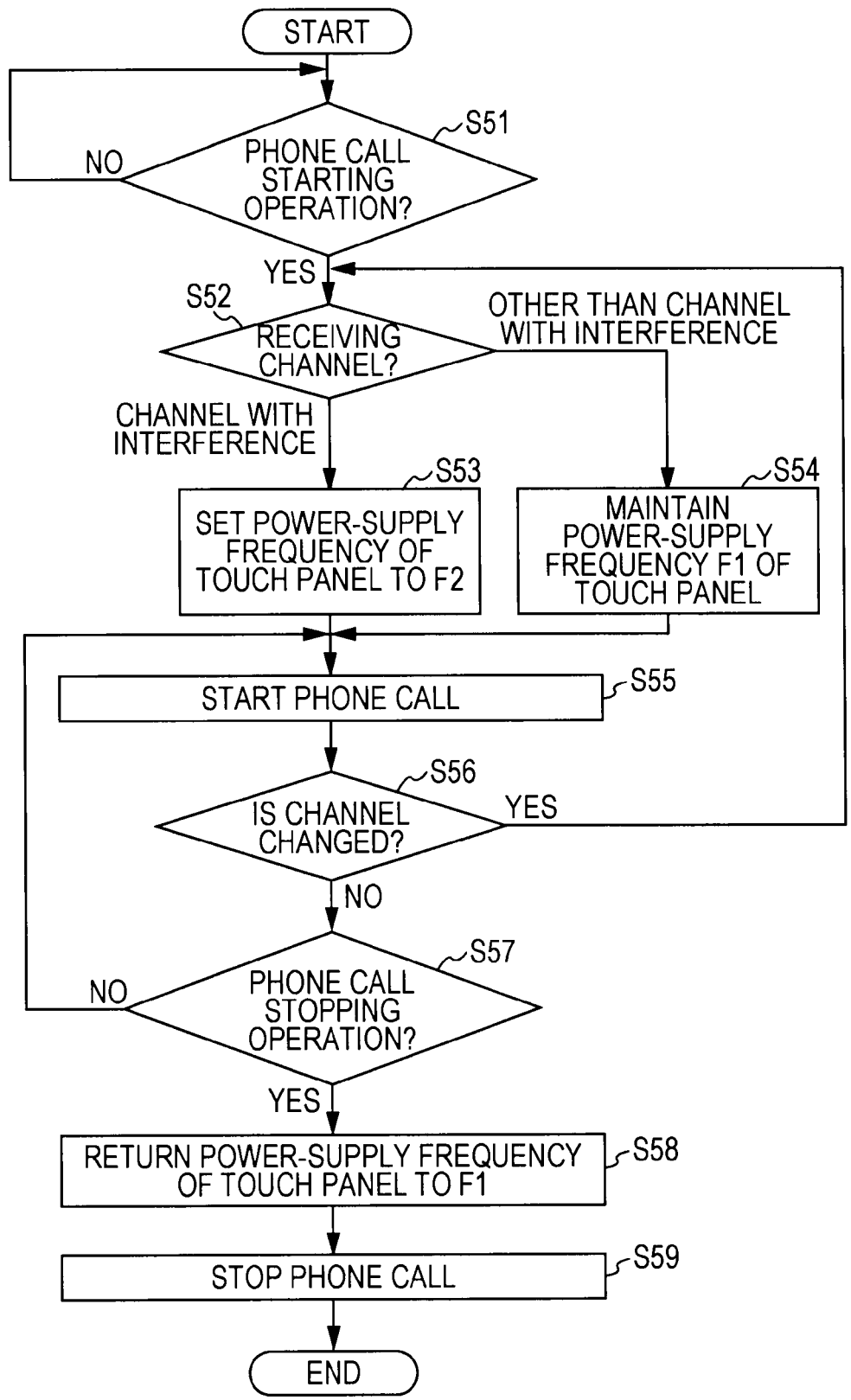
FIG. 11 is a flowchart illustrating a modification of touch-panel control of the terminal device according to an embodiment of the present disclosure.

FIG. 11 is a flowchart illustrating an example of a process for switching the switching frequency of the touch-panel power supply in correspondence with a wireless communication channel (frequency) when the wireless communication unit 111 of the terminal device 100 performs a wireless communication process with a wireless base station.

As shown in FIG. 11, first, the control unit 116 determines whether or not there is a user operation for starting a phone call by wireless communication with the wireless base station. In this determination, when it is determined that the there is no user operation for starting a phone call, the control unit 116 waits until there is a user operation for starting a phone call.

Then, when it is determined in step S51 that there is a user operation for starting a phone call, the control unit 116 determines whether or not the communication channel (frequency) that is used in wireless transmission of phone call audio at this time is a frequency that causes interference in the touch-panel power supply (step S52). The phone call channel is a channel that is assigned from the wireless base station subject to availability of the wireless communication channel. To which degree the frequency used in each communication channel causes interference at the switching frequency of the touch-panel power supply can be determined by performing measurements in advance.

Alternatively, in a case where a plurality of frequency bands, that is, a several hundreds of MHz band, and a several GHz band, are provided as frequency bands used for wireless communication, the entire channel of the several hundreds of MHz band, which is a lower frequency band, may be set as a channel in which there is interference.

When it is determined in step S52 that the communication channel is at a frequency at which interference is not received from the touch-panel power supply, an instruction of setting the switching frequency of the power-supply unit 136 to F2 is sent from the control unit 116 to the touch-panel control unit 133. The touch-panel control unit 133 receiving this instruction sets the switching frequency of the power-supply unit 136 for the touch-panel unit 130 to a frequency F2 (12 MHz) (step S53).

Furthermore, when it is determined in step S52 that the communication channel is at a frequency at which no interference is received from the touch-panel power supply, the control unit 116 sets the switching frequency of the power-supply unit 136 to F1 (24 MHz) (step S54). The switching frequency F1 (24 MHz) is a switching frequency at a normal time.

Then, the control unit 116 causes a voice phone call to be started in a state in which the switching frequency is set in each of steps S53 and S54 in correspondence with a phone call channel (step S55). After this voice phone call is started, it is determined whether or not there is an instruction of changing the communication channel (step S56). The change of the communication channel is performed one after another at the time of a change in the wireless communication environment even during the phone call. Furthermore, the change of the communication channel occurs when the wireless base station of another party with which wireless communication is performed is switched.

When there is a channel change in this determination, the process returns to the determination of step S52. Then, in the processing of steps S52 to S54, the switching frequency is set as a switching frequency corresponding to the communication channel after being changed.

When it is determined in step S56 that there is no change of the communication channel, next, it is determined whether or not there is a user operation for ending the phone call (step S57). When there is no operation for stopping the phone call, the phone call process in step S55 is continued.

When it is determined in step S57 that there is a user operation for ending the phone call, an instruction of returning the switching frequency of the power-supply unit 136 to the frequency F1 at a normal time is sent from the control unit 116 to the touch-panel control unit 133 (step S58). Under this instruction, the switching frequency of the power-supply unit 136 for the touch-panel unit 130 becomes the original frequency F1. In a situation where the frequency F1 has been set in step S54, the switching frequency that is set in step S30 is the same, and an instruction, such as a change of frequency, is not necessary.

Then, in response to the instruction from the control unit 116, the wireless communication for a voice phone call is stopped (step S59).

In a case where, as described above, while the voice phone call is being performed, the wireless communication channel (frequency) that performs wireless communication with the wireless base station is interfered by harmonics of the switching frequency of the touch-panel power supply, the switching frequency is changed to a lower frequency. Therefore, choices of the optimal wireless communication channel increase, and the communication state is improved.

In particular, in a weak electric-field state in which wireless communication is performed in a situation comparatively far from the wireless base station, better wireless communication becomes possible.

In the processing of the flowchart of FIG. 11, the switching frequency is changed in accordance with the wireless communication channel during a phone call. However, during the phone call, the switching frequency may be always set to be low. Alternatively, similarly to the processing described in the flowchart of FIG. 7, the switching frequency may be changed at three steps or at steps more than that in accordance with the interference situation in the wireless communication channel.

Furthermore, here, wireless communication time for a voice phone call is assumed. Alternatively, similar control may be performed also when another wireless communication is performed between the terminal device and the wireless base station. Furthermore, the control of the switching frequency in accordance with these wireless communication channels can be performed in combination with the control at the time of the reception of a television broadcast signal by the above-mentioned tuner. That is, it is sufficient that the control unit 116 performs processing described in the example of each embodiment when a television broadcast is received, and performs processing described in the flowchart of FIG. 11 at the time of wireless communication, such as during a phone call. Alternatively, the control unit 116 may singly perform only the processing at the time of wireless communication shown in the flowchart of FIG. 11.

The terminal device 100 described in the example of the first embodiment is configured as a mobile phone terminal. In addition, the terminal device 100 may be applied to a terminal device of another configuration. That is, the terminal device 100 can be applied to various terminal devices having a function of receiving a television broadcast signal, and a touch panel. For example, the terminal device 100 may be applied to a car navigation device including a touch panel and to a terminal device having a television broadcast receiving function incorporated therein.

Furthermore, in the example of each embodiment, the touch-panel unit is configured to include a step-up power-supply unit and control a switching frequency in a power-supply unit inside the touch-panel unit. In contrast, the power-supply unit (the power-supply unit 152 in FIG. 1) that is connected to a battery inside the terminal device may be configured to include a circuit that performs a similar stepping-up operation, and the power-supply unit may be configured to directly supply the stepped-up power supply to the touch-panel unit, so that the frequency in the power-supply unit is controlled.

Furthermore, the configuration of the power-supply unit that performs stepping up, which is shown in FIG. 3, shows only an example, and another configuration may also be employed. The values of 24 MHz and 12 MHz shown as the switching frequencies of the power-supply unit show only examples, and another switching frequency may be used. The transmission bands of the television broadcast signal to be received show only examples, and may be applied to a case in which a broadcast signal of another band is to be received.

Furthermore, the control unit (central control unit) that controls the operation of the entire terminal device is configured to perform a process for controlling the switching frequency of the power-supply unit. Alternatively, the tuner control unit or the touch-panel control unit may issue an instruction of controlling the switching frequency.

Furthermore, in the example of each embodiment, after the switching frequency of the power-supply unit is lowered when the reception of the television broadcast is started, the switching frequency is maintained until the reception of the television broadcast is stopped. In comparison, for example, even in a state in which the reception of the television broadcast in the tuner is continued, when a touch is detected in the touch-panel unit, the switching frequency may be temporarily returned to the original frequency, and touch detection accuracy may be temporarily returned to the original. In this case, for example, after the switching frequency is returned to the original frequency, when touch detection does not occur for a certain time period, the switching frequency may be returned to the lowered switching frequency once more.

Furthermore, in the examples of the embodiments, the terminal device 100 in which a control program executed by the control unit 116 is incorporated in advance so that an operation of controlling the switching frequency of the touch-panel unit is performed has been used. In comparison, by implementing a program (software) including steps for performing a control processing method of the present disclosure in the existing terminal device including a touch panel and a television broadcast reception tuner, a terminal device that performs corresponding operations may be obtained. For the terminal device implementing programs, various information processing terminals, such as a computer device into which a program can be installed, can be applied.

The invention claimed is:

1. An information processing apparatus comprising:
a tuner that receives a wireless digital video broadcast (DVB) signal;
a power supply that converts an input direct current (DC) power supply into a predetermined voltage by switching the input DC power supply at a switching frequency to generate a driving power supply;
a touch-panel display that displays video corresponding to the DVB signal received by the tuner, wherein the driving power supply generated by the power supply powers the touch-panel display; and
a controller that determines a frequency channel of the DVB signal received by the tuner and controls the switching frequency to avoid interference between the driving power supply and the DVB signal received by the tuner by controlling the switching frequency to be 24 MHz when the determined frequency channel of the DVB signal is a first frequency, and controlling the switching frequency to be 12 MHz or 6 MHz when the determined frequency channel of the broadcast television signal is a second frequency, which is less than the first frequency.

2. The information processing apparatus of claim 1, wherein the controller controls the switching frequency to be 24 MHz when the determined frequency channel of the broadcast television signal is the first frequency, controls the switching frequency to be 12 MHz when the determined frequency channel of the broadcast television signal is the second frequency, and controls the switching frequency to be 6 MHz when the determined frequency channel of the broadcast television signal is a third frequency, which is less than the second frequency.

3. The information processing apparatus of claim 1, wherein the controller obtains a signal quality value corresponding to a signal received at the tuner as and controls the switching frequency based on the signal quality value.

4. The information processing apparatus of claim 3, wherein the controller compares the signal quality value to a predetermined threshold value and decreases the switching frequency when the signal quality value is less than the predetermined threshold value.

5. The information processing apparatus of claim 4, wherein the controller iteratively performs the obtaining and comparing at predetermined intervals.

6. The information processing apparatus of claim 3, wherein the signal quality value corresponds to a Modulation Error Value (MER) or a Bit Error Rate (BER) value of the signal received at the tuner.

7. The information processing apparatus of claim 1, further comprising:
a wireless communication interface that performs wireless communication with a wireless base station.

8. The information processing apparatus of claim 7, wherein the controller determines a frequency channel of the wireless communication and controls the switching frequency based on the determined frequency channel of the wireless communication.

9. The information processing apparatus of claim 8, wherein the controller determines that the frequency channel of the wireless communication interferes with a current switching frequency of the power supply and controls the power supply to lower the switching frequency based on the determination.

10. A power supply method performed by an information processing apparatus, the method comprising:

receiving, at a tuner of the information processing apparatus, a wireless digital video broadcast (DVB) signal;
converting, at a power supply of the information processing apparatus, an input direct current (DC) power supply into a predetermined voltage by switching the input DC power supply at a switching frequency to generate a driving power supply;
displaying, by a touch-panel display of the information processing apparatus, video corresponding to the DVB signal received by the tuner, wherein the driving power supply generated by the power supply powers the touch-panel display,
determining a frequency channel of the DVB signal received by the tuner; and
controlling, by a controller of the information processing apparatus, the switching frequency to avoid interference between the driving power supply and the DVB signal received by the tuner by controlling the switching frequency to be 24 MHz when the determined frequency channel of the DVB signal is a first frequency, and controlling the switching frequency to be 12 MHz or 6 MHz when the determined frequency channel of the broadcast television signal is a second frequency, which is less than the first frequency.

11. A non-transitory computer-readable medium including computer program instructions, which when executed by an information processing apparatus, cause the information processing apparatus to perform a method comprising:
receiving a wireless digital video broadcast (DVB) signal;
converting an input direct current (DC) power supply into a predetermined voltage by switching the input DC power supply at a switching frequency to generate a driving power supply;
displaying, by a touch-panel display of the information processing apparatus, video corresponding to the DVB signal received by the tuner, wherein the driving power supply generated by the power supply powers the touch-panel display;
determining a frequency channel of the DVB signal received by the tuner; and
controlling the switching frequency to avoid interference between the driving power supply and the DVB signal received by the tuner by controlling the switching frequency to be 24 MHz when the determined frequency channel of the DVB signal is a first frequency, and controlling the switching frequency to be 12 MHz or 6 MHz when the determined frequency channel of the broadcast television signal is a second frequency, which is less than the first frequency.

* * * * *